No. 627,268.  Patented June 20, 1899.
G. W. NEWSON & J. P. HARRIS.
BICYCLE SUPPORT.
(Application filed Oct. 27, 1898.)

(No Model.)  2 Sheets—Sheet 1.

Witnesses:
E. R. Bolton

Inventors:
George Wesley Newson
John Porter Harris
By Richard
their Attorneys

No. 627,268. Patented June 20, 1899.
G. W. NEWSON & J. P. HARRIS.
BICYCLE SUPPORT.
(Application filed Oct. 27, 1898.)
(No Model.) 2 Sheets—Sheet 2.
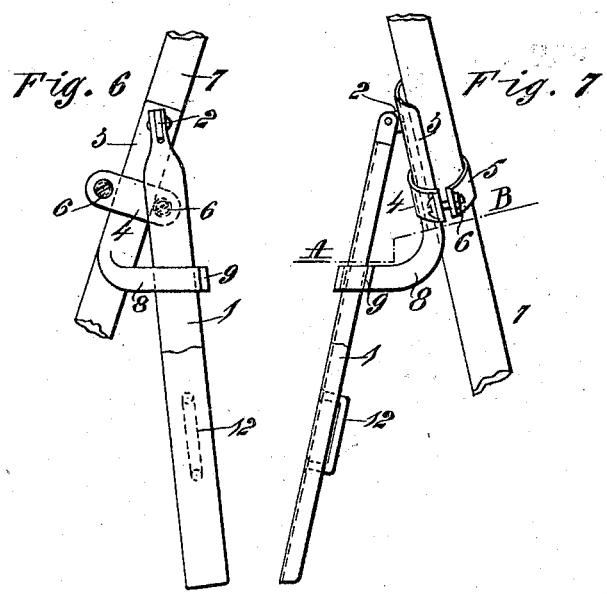
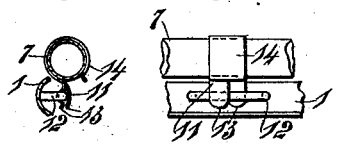 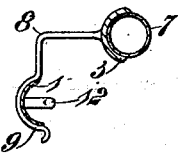
Witnesses: 

UNITED STATES PATENT OFFICE.

GEORGE WESLEY NEWSON AND JOHN PORTER HARRIS, OF WELLINGTON, NEW ZEALAND.

BICYCLE-SUPPORT.

SPECIFICATION forming part of Letters Patent No. 627,268, dated June 20, 1899.

Application filed October 27, 1898. Serial No. 694,720. (No model.)

*To all whom it may concern:*

Be it known that we, GEORGE WESLEY NEWSON and JOHN PORTER HARRIS, subjects of the Queen of Great Britain, residing at 54 Lambton Quay, Wellington, New Zealand, have invented an Improved Support for Bicycles, of which the following is a specification.

This invention relates to supports used for propping bicycles; and the object of the invention is to provide a support by which a bicycle may be securely sustained without danger of its falling over.

We are aware that supports have been devised for purposes similar to that set forth herein; but it has hitherto been necessary to be careful to properly adjust the support in order that the machine might not fall over. With our invention a bicycle may be quickly and readily fixed with certainty that it will remain upright. Further, it is not necessary to lock the front wheel, since the bicycle will remain standing even when the front wheel is at right angles to the rear wheel or when the machine is placed on uneven ground.

The invention comprises an arm which constitutes the support proper, pivoted to a bracket by means of a swiveling stud, said bracket having a hook or catch and a spring-clip or the like for retaining the arm.

In order that our invention may be most easily understood, reference will be made to the accompanying drawings, on which—

Figure 1:
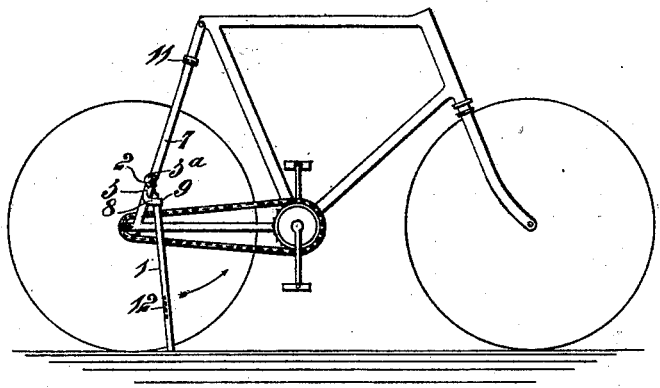
Figure 2:
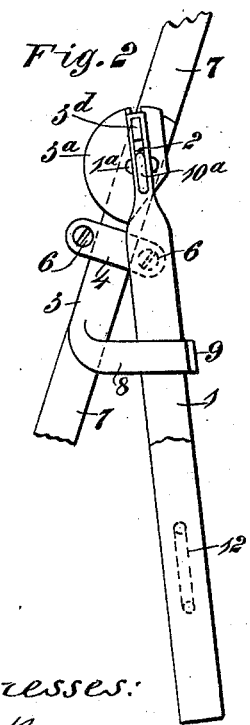
Figure 4:
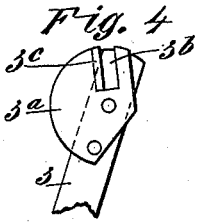
Figure 5:
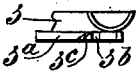
Figure 3:
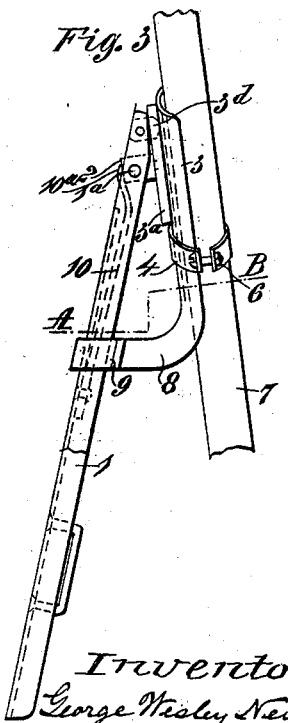

Figure 1 is a side view showing the principal parts of a bicycle with our support attached and lowered to its working position. Fig. 2 is a side view showing a portion of the backstay of a bicycle with the support attached on a larger scale. Fig. 3 is a front view of the same. Fig. 4 is a front view of a disk and a portion of the bracket. Fig. 5 is a plan of the same. Fig. 6 shows a support without a disk. Fig. 7 is a front view of the same. Fig. 8 is a section on line A B, Fig. 3. Fig. 9 shows a clip for holding the support when not in use. Fig. 10 is a side view of the same.

Similar figures of reference indicate corresponding parts throughout the views.

Referring to the drawings, the arm 1 is curved in section, as shown on Figs. 8 and 9, and is pivoted at $1^a$ to the stud 2, which is made to swivel in the disk $3^a$ and bracket 3. The strap 4 is secured to or made solid with the bracket 3 and by means of its back strap 5 and bolts 6 secures the bracket to the backstay 7. The bracket 3 has an arm terminating in a catch or hook 9 and is made sufficiently strong to bear the strain which arises when the bicycle is leaning thereon. Within the arm 1 is supplied a spring 10, the extremity $10^a$ of which presses upon the flat top of the stud 2. The disk $3^a$ is fixed to the bracket 3 and has a slot $3^b$ with one edge beveled. The arm 1 is extended above the pivot $1^a$ and is supplied with a block $3^d$ and near its lower extremity with a loop 12.

The spring-clip 11, Figs. 1, 9, and 10, springs upon the backstay by its loop 14 and has tongues 13, formed by splitting the end of the spring-clip and bending the same to the shape shown on Fig. 9. This clip 11 may be permanently fixed to the frame of the machine, if desired. This form of clip we prefer, but any ordinary form may be used.

When not in use, the arm 1 is held parallel with the backstay by the spring-clip 11, where it is almost unobservable and offers no impediment to the proper working of the bicycle. The said clip holds the arm by gripping the loop 12 between the tongues 13.

To bring the support into use for propping a bicycle, the arm 1 is released from the clip 11 and thrown downward, when it will pivot upon its stud 2. During the descent of the arm the block $3^d$ rides upon the face of the disk $3^a$, being pressed against the same by the spring 10, so that when the arm reaches the catch or hook 9 it is ready to pass within the same. The block $3^d$ then passes into the slot $3^b$ and allows the arm to pass within the catch or hook 9 and assume its proper position to support the bicycle, which is effected by inclining the machine until the arm rests upon the ground. The grip which the catch 9 has upon the arm effectually prevents the machine falling over or moving backward or forward on uneven ground.

On the cheaper form (shown on Figs. 6 and 7) the disk is dispensed with and the arm guided into the hook 9 by hand.

The spring 10 may be dispensed with; but in such case the arm 1 must be adjusted within the hook, even though the machine has had a slight movement only.

What we claim, and desire to secure by Letters Patent of the United States, is—

1. In combination with a bicycle-frame, an arm 1 pivotally connected therewith, a catch on the frame to engage the arm when the same is moved laterally and a disk attached to the frame over the face of which a portion of the arm moves, said disk having a slot to allow the arm to be moved laterally when it is opposite the catch on the frame, substantially as described.

2. In combination, the disk and bracket held on the frame, the arm swiveled to the disk by a swiveled stud, said arm having an upwardly-extending end above the stud, a block carried by said end adapted to fit a slot in the disk, a catch 9 carried by the bracket at a point below the disk to engage the arm and a spring for pressing the arm so that the block on its upper end will engage the slot in the disk, substantially as described.

In witness whereof we have hereunto set our hands in the presence of two witnesses.

GEORGE WESLEY NEWSON.
JOHN PORTER HARRIS.

Witnesses:
JOHN SCOTT,
WILLIAM JOHNSTON.